United States Patent [19]

Hess et al.

[11] Patent Number: 4,698,997
[45] Date of Patent: Oct. 13, 1987

[54] OSCILLATION PRESSURE DEVICE FOR DYNAMIC CALIBRATION OF PRESSURE TRANSDUCERS

[75] Inventors: Robert W. Hess; William T. Davis, both of Yorktown; Pamela A. Davis, Newport News, all of Va.

[73] Assignee: The United States of America as represented by the Administrator of the National Aeronautics and Space Administration, Washington, D.C.

[21] Appl. No.: 890,983

[22] Filed: Jul. 30, 1986

Related U.S. Application Data

[63] Continuation-in-part of Ser. No. 711,551, Mar. 14, 1985, abandoned.

[51] Int. Cl.⁴ .................................. G01L 27/00
[52] U.S. Cl. .................................... 73/4 R
[58] Field of Search ............... 73/4 R, 4 V, 4 D, 147, 73/866.4, 865.6

[56] References Cited

U.S. PATENT DOCUMENTS

| | | | |
|---|---|---|---|
| 2,976,715 | 3/1961 | Roese et al. | 73/4 R |
| 3,045,470 | 7/1962 | Crandell et al. | 73/4 R |
| 3,232,091 | 2/1966 | Glassey | 73/4 R |
| 3,237,443 | 3/1966 | Vinson | 73/4 R |
| 3,383,903 | 5/1968 | Bogusz | 73/4 R |
| 3,427,858 | 2/1969 | Morrison | 73/4 V |
| 3,590,626 | 7/1971 | Hugli | 73/4 R |
| 3,777,546 | 12/1973 | Rollins | 73/4 R |
| 3,868,844 | 3/1975 | Klein | 73/4 R |
| 4,051,712 | 10/1977 | Zias et al. | 73/4 R |
| 4,499,751 | 2/1985 | Riggs | 73/4 R |
| 4,512,179 | 4/1985 | Umble et al. | 73/4 R |
| 4,515,012 | 5/1985 | Jenkins et al. | 73/4 R X |
| 4,590,791 | 5/1986 | Reed et al. | 73/4 R |

FOREIGN PATENT DOCUMENTS 267979  7/1970  U.S.S.R. .................. 73/4 R

OTHER PUBLICATIONS

"Primary Calibration of Pressure Transducers to 10,000 H2", Conference: Proceedings of the 15th International ISA Aerospace Instrument Symposium, Las Vegas, NV, USA, May 1960, John D. Favour et al., pp. 89-96.
"Calibrator for Dynamic Pressure Transducers", *Instruments & Automation*, vol. 27; pp. 1074-1075, Raymond C. Baird et al. Jul. 1954.
"Basic Study into the Evaluation of Transducer-Type Pressure Gauges", *Instrument Practice*, pp. 303-304, Mar. 1959.
AIAA-87-0035, "Highlights of Unsteady Pressure Tests on a 14 Percent Supercritical Airfoil at High Reynolds Number, Transonic Condition", 17 page paper presented at AIAA 25th Aerospace Sciences Meeting, Jan. 1987, Reno, Nevada, Robert W. Hess et al. & color photographic blowups of FIGS. 1 & 2 from p. 6 of above paper.

*Primary Examiner*—Tom Noland
*Attorney, Agent, or Firm*—George F. Helfrich; John R. Manning

[57] ABSTRACT

Method and apparatus for obtaining dynamic calibrations of pressure transducers. A calibration head (15), a flexible tubing (23) and a bellows (20) enclose a volume of air at atmospheric pressure with a transducer (11) to be calibrated subject to the pressure inside the volume. All of the other apparatus in the drawing apply oscillations to bellows (20) causing the volume to change thereby applying oscillating pressures to transducer (11) whereby transducer (11) can be calibrated.

10 Claims, 1 Drawing Figure

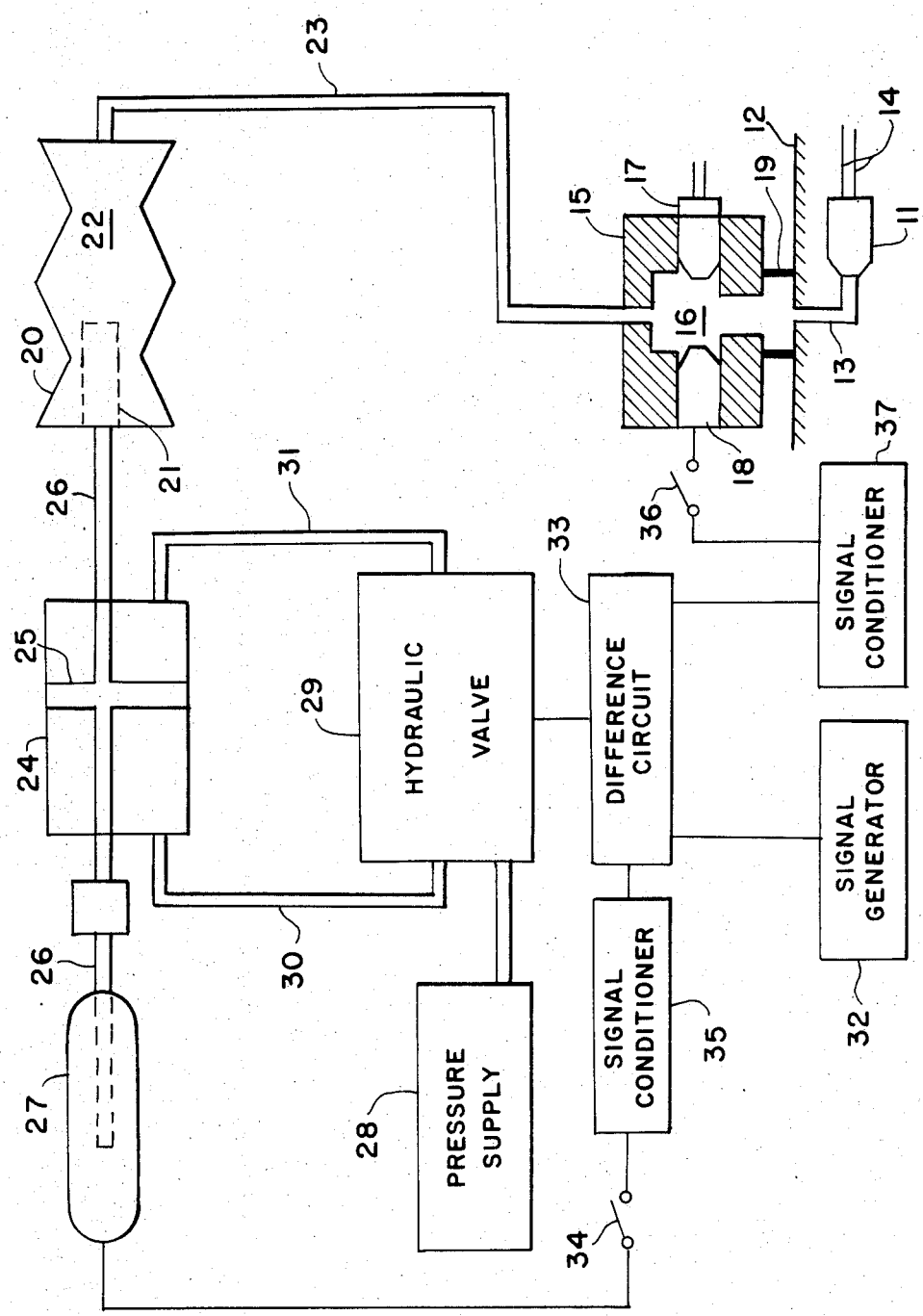

OSCILLATION PRESSURE DEVICE FOR DYNAMIC CALIBRATION OF PRESSURE TRANSDUCERS

ORIGIN OF THE INVENTION

The invention described herein was made by employees of the United States Government and may be manufactured and used by or for the Government for governmental purposes without the payment of any royalties thereon or therefor.

This application is a continuation-in-part of application Ser. No. 711,551, filed Mar. 14, 1985, now abandoned.

BACKGROUND OF THE INVENTION

This invention relates generally to calibrators and in particular to a portable oscillating pressure device for the dynamic calibraion of pressure transducers.

Prior dynamic transducer calibrations were made using a static calibration device to determine the sensitivity of the pressure transducer. Dynamic transducer calibration could be made at only one frequency in the kilo hertz range at amplitudes on the order of 0.01 psi using an acoustic calibrator with the transducer mounted in an adapting fixture accepted by the calibrator. The range of pressure and frequencies of interest in unsteady aerodynamic pressure measurements is from 0.1 to 2 psi and from 4 Hz to 200 Hz. The previous techniques do not satisfy the requirements outlined above because the dynamic calibration cannot be performed in situ at representative frequencies and oscillating pressures.

An object of the present invention is a method and apparatus to accurately measure the dynamic characteristics of pressure transducers installed in models and flight vehicles at the frequency and oscillating pressure ranges encountered during an unsteady pressure measurement test to establish that static and dynamic sensitivities are the same.

Another object of the invention is a method and apparatus to accurately measure the dynamic characteristics of pressure transducers in their installation configurations to determine if the installation configuration effects the amplitude and phase response as related to conditions on the surface of the model.

A further object of the invention is an apparatus that is portable and can accurately measure the dynamic characteristics of pressure transducers in situ.

Other objects and advantages of the present invention will be readily apparent from the following description and drawing which illustrates a preferred embodiment of the present invention.

SUMMARY OF THE INVENTION

The present invention involves a method and apparatus for the dynamic calibration of pressure transducers installed in models and flight vehicles, over a range of frequencies and oscillating pressures typically encountered during an unsteady pressure measure test. A certain oscillating pressure is produced and transmitted to the surface of the installation configuration under which lie the transducers to be calibrated. The resulting outputs of the transducers are compared with the oscillating pressure or with the output from a standard transducer to perform a dynamic calibration of the transducers located under the surface.

BRIEF DESCRIPTION OF THE DRAWINGS

The sole FIGURE is a schematic block diagram of a preferred embodiment of the invention.

DESCRIPTION OF THE PREFERRED EMBODIMENT

Turning now to the embodiment of the invention selected for illustration in the drawing, the number 11 designates a transducer that is to be calibrated. Transducer 11 is located below a surface 12 and has a hole 13 leading to it through which pressure measurements are made by the transducer. The output of transducer 11 is through electrical leads 14. A calibration head 15 has a chamber 16 and is designed so that the calibration head will set flat on surface 12 and subject the pressure inside chamber 16 to transducer 11 through hole 13. A short length of tubing 19 extends from the calibration head 15 and covers hole 13 to provide a seal around the hole. A short length of tubing (not shown) could extend from the bottom of the calibration head 15 into hole 13 to provide a seal around transducer 11. Calibration head 15 has a hole in it so that a standard transducer 17 can be fitted pressure tight into the hole by any conventional means such as threads and be subjected to pressure in chamber 16. In another hole in calibration head 15 a pressure transducer 18 is pressure tight fitted so that it will produce an output proportional to the pressure inside chamber 16. A bellows 20 including a Teflon shaft 21 has a chamber 22. Teflon shaft 21 is connected to the free end of bellows 20 and keeps the bellows axially aligned during compression and also reduces the inactive volume of the bellows. Chamber 16 of the calibration head 15 is connected to chamber 22 at the fixed end of bellows 20 by means of a flexible tubing 23. Consequently, calibration head 15 is easily movable relative to bellows 20.

A hydraulic actuator 24 including a piston 25 and a shaft 26 has its shaft attached to Teflon shaft 21. Whenever piston 25 is moved in either direction shaft 26 collapses or expands bellows 21 thereby changing the volume of chamber 22. Shaft 26 is also attached to the probe of a linear-variable-differential-transformer (LVDT) 27 which produces a signal indicating the position of piston 25. Piston 25 is positioned by a hydraulic pressure supply 28 and a hydraulic valve 29 by controlling the pressure through tubings 30 and 31 to hydraulic actuator 24.

Hydraulic valve 29 is controlled by a low frequency signal from a signal generator 32 which is applied through a difference circuit 33 to the valve. The output of signal generator 32 can be varied in frequency and amplitude. Signal generator 32 should be of the type capable of generating various waveforms across the desired spectrum of frequencies and amplitudes. Generator 32 should also possess an automatic sweep function to provide for the continuous variation of amplitude and frequency across the desired spectrum. A generator of this type that was used and that is commercially available is a Bafco Model SD 330A Real-Time Spectro Analyzer. Hydraulic valve 29 is also controlled by a servo feedback means by closing a switch 34 which applies the output from LVDT 27 through a signal conditioner 35 to difference circuit 33. In addition, hydraulic valve 29 can be controlled by a second servo feedback means by closing a switch 36 which applies the signal from transducer 18 through a signal conditioner 37 to difference circuit 33.

In the operation of this invention, calibration head 15 is placed over hole 13 thereby enclosing chamber 16 at atmospheric pressure. The type of control is selected by closing one of the switches 34 or 36. Then a signal is generated by signal generator 32 thereby moving piston 25, changing the volume of chamber 22 and changing the pressure inside chamber 16. The outputs of transducers 11 and 17 are then measured. Inasmuch as the system has been calibrated to know the pressure in chamber 16 corresponding to the signal output of signal generator 32 all of the data is available for calibrating transducer 11.

The advantages of the present invention are numerous. It is especially useful as a portable transducer calibrator. The invention provides a means of dynamically and statically calibrating a pressure transducer mounted in its installation configuration in a model or aircraft over a range of frequencies and amplitudes not available in commercial acoustic calibration devices. Additionally, the invention accurately calibrates these transducers by maintaining a constant oscillating pressure through the use of a servo feedback system. Furthermore, the constant oscillating pressure is developed using an open air bellows apparatus thereby removing the requirmeent of a closed gaseous or liquid pressure producing system.

The above described description and drawings are only illustrative of preferred embodiments which achieve the objects, feature, and advantages of the present invention, and it is not intended that the present invention is limited thereto. Any modifications of the present invention which come within the spirit and scope of the following claims are considered part of the present invention. One such modification would be the use of a linear magnetic shaker to drive the system in place of the oscillating drive system shown and described

What is claimed to be new and desired to be secured by Letters Patent of the United States is:

1. A method for dynamically calibrating a transducer operating in the unsteady aerodynamic pressure range and located below the surface of a model comprising the steps of:
    locating a standard transducer adjacent to the surface of a model nearby the transducer being calibrated whereby pressure measurements along the top of the model are obtained;
    enclosing a volume of air at atmospheric pressure with the transducer located below the surface and the standard transducer adjacent to the surface subjected to the pressure inside the volume;
    changing the volume by a controlled amplitude and frequency; and
    varying the controlled amplitude and its frequency continuously whereby the transducer located below the surface is subjected to a pressure in the unsteady aerodynamic pressure range and the resulting output of the transducer located below the surface can be calibrated against the actual pressures along the top of the model as measured by the standard transducer located adjacent to the surface.

2. Apparatus for dynamically calibrating a transducer operating in the unsteady aerodynamic pressure range and located below the surface of a model comprising:
    an enclosure for enclosing a chamber of air at atmospheric pressure;
    means for locating a standard transducer adjacent to the surface of a model nearby the transducer being calibrated whereby pressure measurements along the top of the model are obtained;
    means for connecting the transducer located below the surface of a model and said standard transducer to said chamber to thereby subject the transducer and said standard transducer to the pressure inside said chamber;
    means for changing the volume inside said chamber by controlled amplitudes and frequencies to thereby change the pressure on said transducer; and
    means for varying the controlled amplitudes and frequencies continuously whereby said transducer can be calibrated while operating in the unsteady aerodynamic pressure range.

3. Apparatus according to claim 2 wherein said enclosure is a bellows that can be either contracted or expanded.

4. Apparatus according to claim 3 wherein said means for changing the volume inside said chamber is a hydraulic actuator connected to said bellows, a pressure supply and a hydraulic valve under the control of a signal generator for controlling the pressure to said hydraulic actuator.

5. Apparatus according to claim 4 including means for producing a signal proportional to the pressure inside said chamber and means for subtracting said signal from the signal from said signal generator to obtain a difference signal that is used to control said hydraulic valve.

6. Apparatus according to claim 2 wherein said means for connecting said transducer to said chamber is a calibration head with a flexible tubing connecting the calibration head to said chamber whereby the calibration head can be portable.

7. Apparatus according to claim 6 wherein said calibration head provides the means for connecting said standard transducer to said chamber whereby said transducer can be calibrated against said standard transducer.

8. Apparatus according to claim 6 wherein said calibration head provides said means for locating said standard transducer adjacent to the surface.

9. Apparatus according to claim 2 wherein said means for varying the controlled amplitudes and frequencies includes a signal generator whereby said signal generator produces signals that control the amplitude and frequency of the pressure inside said chamber so that the transducer can be calibrated while operating in the unsteady aerodynamic pressure range.

10. Apparatus for dynamic calibration of a pressure transducer over a range of frequencies of oscillating pressures and located below the surface of a model comprising:
    means for enclosing a chamber of air with the transducer and a standard transducer only subject to the pressure inside said chamber;
    means for locating said standard transducer adjacent to the surface of a model nearby the transducer being calibrated whereby pressure measurements along the top of the model are obtained;
    means for producing a back and forth motion of an object at selected low frequencies;
    means for continuously varying the back and forth motion of said object whereby a range of amplitudes and frequencies of oscillating pressures is developed; and
    means responsive to the motion of said object for changing the volume of said chamber whereby said transducer located below the surface of the model can be calibrated against said standard transducer over the range of amplitudes and frequencies of oscillating pressures.

* * * * *